United States Patent [19]

Thell

[11] Patent Number: 4,604,630

[45] Date of Patent: Aug. 5, 1986

[54] METHOD OF APPLYING AN ELECTRICAL CHARGE IN INK JET PRINTERS, AND AN ARRANGEMENT FOR CARRYING THE METHOD

[75] Inventor: Bengt Thell, Eslöv, Sweden

[73] Assignee: Esselte Sanden AB, Eslöv, Sweden

[21] Appl. No.: 662,823

[22] Filed: Oct. 19, 1984

[30] Foreign Application Priority Data

Oct. 24, 1983 [SE] Sweden ............................ 8305841

[51] Int. Cl.[4] ............................ G01D 15/18
[52] U.S. Cl. ............................ 346/1.1; 346/75
[58] Field of Search ............................ 346/1, 75

[56] References Cited

U.S. PATENT DOCUMENTS

| | | | |
|---|---|---|---|
| 3,786,517 | 1/1974 | Krause | 346/75 |
| 4,364,057 | 12/1982 | Ebi et al. | 346/75 |
| 4,367,476 | 1/1983 | Sagae | 346/75 X |
| 4,417,256 | 11/1983 | Fillmore et al. | 346/75 |
| 4,438,440 | 3/1984 | Jinnai et al. | 346/75 |

*Primary Examiner*—George H. Miller, Jr.
*Attorney, Agent, or Firm*—Nies, Webner, Kurz & Bergert

[57] ABSTRACT

A method for applying an electric charge in ink jet printers of the so-called continuous kind, in which electrically conductive ink or like medium is forced in the form of a jet (3) from a container through a nozzle (1) or the like and is caused to form droplets (4), which are electrically charged and which are caused to pass deflecting electrodes (6) to which a voltage is applied and are caused to travel along a movement path dependent, inter alia, upon the electric charge, thereby to provide a pre-determined transcript or the like on a printing sheet (5) or corresponding material. The method according to the invention is particularly characterized in that disturbances of a given kind are generated in a known manner by means of a piezo-electric crystal (8) and are caused to act upon the jet (3) in a manner to cause the jet to disintegrate into droplets (4) in a pre-determined fashion, and in that the ink is electrically charged in the nozzle (1) by varying the voltage applied while taking into account the pre-determined frequency at which droplets are separated, whereby practically each droplet (4) is given an individual, pre-determined charge lying in relation with the level of voltage applied on conjunction with the separation of the droplets (4). The invention also relates to an arrangement for carrying out the method.

15 Claims, 3 Drawing Figures

Figure 1:
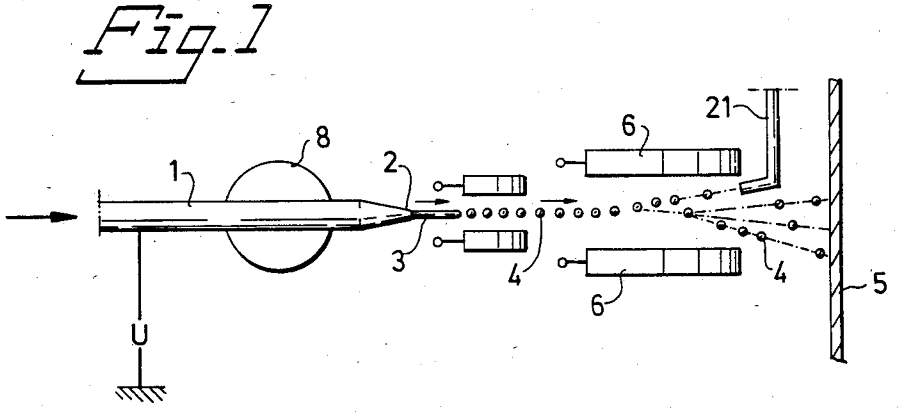

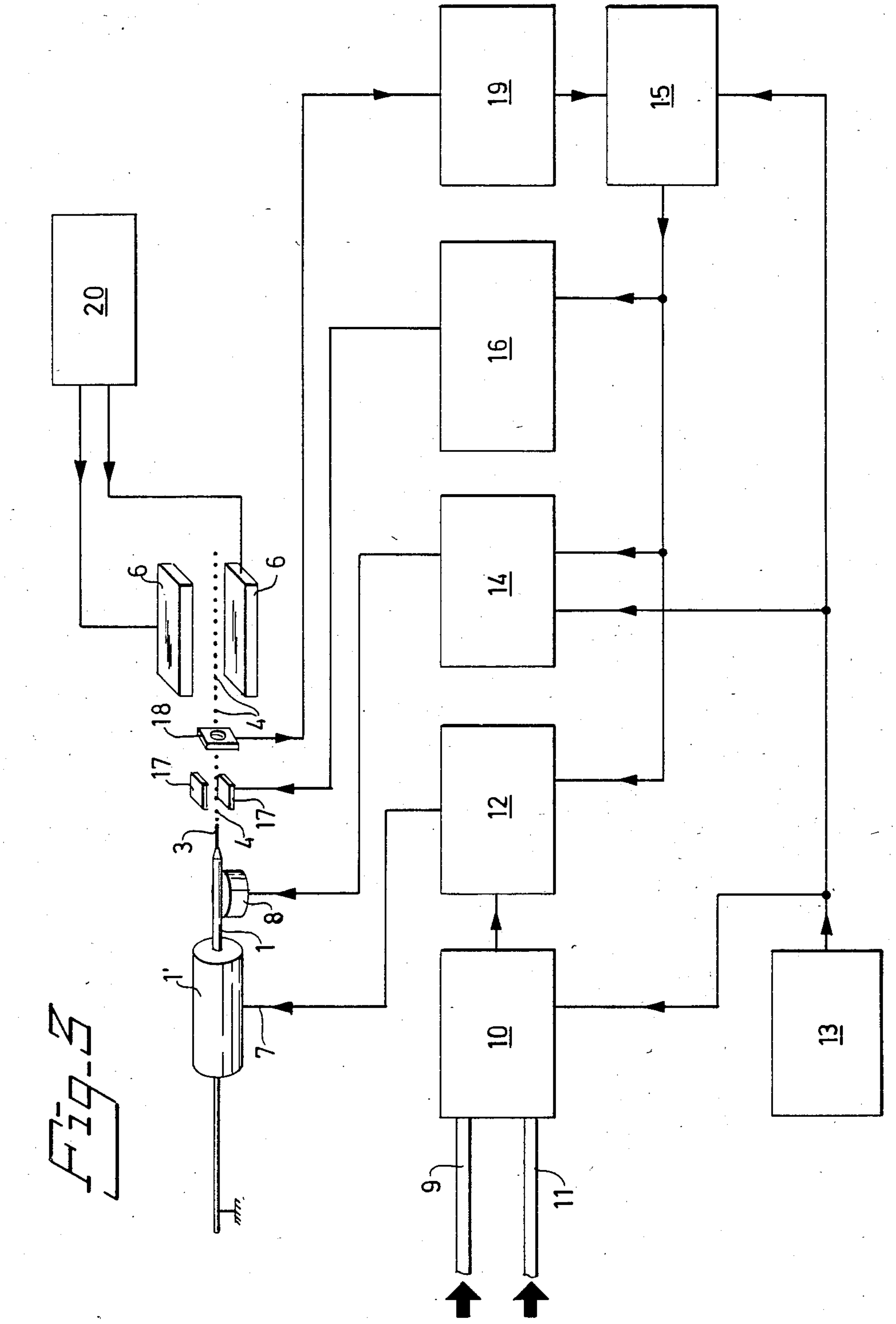
20
19
15
16
14
12
10
13
6
6
18
17
17
4
4
3
8
1
1'
7
9
11

METHOD OF APPLYING AN ELECTRICAL CHARGE IN INK JET PRINTERS, AND AN ARRANGEMENT FOR CARRYING THE METHOD

The present invention relates to a method for applying an electrical charge in ink jet printers of the so-called continuous kind, in which electrically conductive ink or the like is forced from a container and broken-up into droplets to which an electrical charge is applied and which are caused to travel along a path determined by, inter alia, said charge, for example by causing the droplets to pass through electrically charged plates. The invention also relates to an arrangement for carrying out the method according to the invention.

Printers of this kind are previously known. In these known printers, the ink is forced through a nozzle to form an ink jet, which is caused to disintegrate into droplets which are passed between electrically charged electrode-plates and charged electrically by induction.

Also known to the art is a printer in which a constant voltage can be applied to the ink located in the nozzle, in accordance with the on-off-method, wherewith some droplets are charged electrically to a level which is constant for all of the electrically charged droplets, while some droplets remain uncharged. The electrically charged droplets are deflected and do not strike the material to be printed upon, while the electrically neutral droplets strike said material. The resolution and controllability of this kind of printer are poor, since there is a lack of coordination between disintegration of the jet and application of said voltage. It is conceivable to coordinate the formation of droplets and the application of voltage.

The present invention relates to a method and an arrangement in printers of the aforesaid kind, by means of which each droplet can be given an individual, pre-determined charge. This results in extremely good resolution and controllability, and in a high degree of precision with regards to the characters, symbols, etc. to be printed by the printer.

Thus, the invention relates to a method for applying an electrical charge in ink jet printers of the so-called continuous kind, in which electrically conductive ink or the like is forced in the form of a jet from a container, through a nozzle or the like, and is disintegrated into droplets, to which an electrical charge is applied and which, by passing said droplets through electrically charged deflector electrodes, are caused to travel in a movement path determined, inter alia, by said charge, to produce a given transcript or the like on a printing sheet or corresponding material. The method is particularly characterized in that disturbances of a given kind are generated in a known manner by means of a piezo-electric crystal and are caused to act upon said jet in a manner such that the jet is disintegrated into droplets in a pre-determined fashion, and in that the ink is charged electrically in said nozzle by varying the level of voltage applied in accordance with the predetermined frequency at which droplets are separated, thereby to give practically each droplet an individual pre-determined charge which lies in relation to the level of the voltage applied in conjunction with the separation of said droplets.

The invention also relates to an arrangement for applying an electric charge in ink jet printers of the so-called continuous kind, in which electrically conductive ink or the like located in a container therefor is forced through a nozzle therefrom in the form of a jet from which droplets are formed, and which arrangement includes means for electrically charging said droplets, and further includes deflecting electrodes to which a voltage is applied and by means of which the droplets can be caused to travel along a movement path determined, inter alia, by said charge, in a manner to produce a given transcript or the like on a printing sheet or corresponding material.

The arrangement is particularly characterized by a piezo-electric crystal of known kind arranged to generate disturbance waves of a given kind such as to disturb the jet in a known manner, enabling disintegration of the jet into droplets to be pre-determined; and by means for applying a voltage to the ink in the nozzle in co-ordination with the generation of said waves of a given kind for disturbing the jet, whereby said voltage can be applied at a level dependent upon the frequency at which droplets are separated, and whereby each droplet can be given an individual pre-determined electrical charge.

Figure 2:
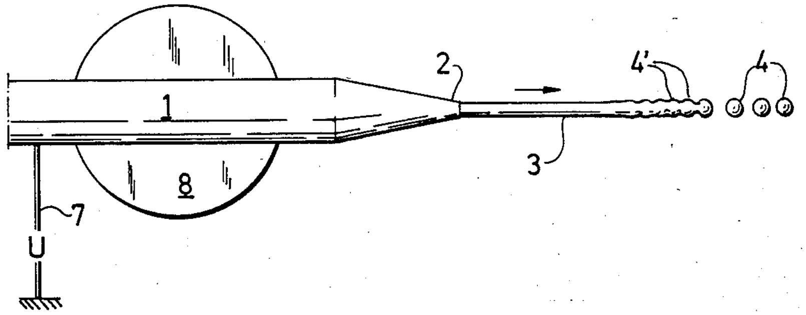

The invention will now be described in more detail with reference to an embodiment thereof illustrated in the accompanying drawings, in which FIG. 1 illustrates schematically an embodiment of an arrangement according to the invention;

FIG. 2 illustrates schematically an arrangement according to the invention for producing droplets of ink or corresponding medium, and electrically charging the droplets; and FIG. 3 illustrates an embodiment of an arrangement according to the invention provided with a control system.

The arrangement illustrated in FIG. 1 comprises a nozzle 1 having an exit orifice 2, at the tip thereof and communicating with a vessel (not shown) containing ink or corresponding medium, which is forced from the vessel out through the orifice 2, to form an ink jet 3. The ink is under a substantially constant pressure of, for example, about 0.6 MPa, and the diameter of the nozzle orifice 2 is about 40–50 μm. The jet 3 is intended to be broken-up to form droplets 4, which are intended to impinge upon, to strike, a medium 5, such as a printing sheet 5, so as to produce characters, symbols and the like thereon. The droplets 4 are intended to be charged with a given electric charge and the reference 6 identifies deflecting plates which are placed under high voltage, such as two kilovolts, and by means of which the droplets 4 are caused to travel along a path determined, inter alia, by said charge, as indicated in FIG. 1.

In accordance with the invention, the illustrated embodiment is provided with means 7, such as at least one electrical conductor 7, by which a voltage can be applied to the ink present in the nozzle 1, in a conventional manner, such as to give each droplet 4 formed from the jet 3 an electric charge which lies in relation with the voltage applied to the ink in the nozzle 1 in conjunction with the separation of droplets from the jet.

The reference 8 illustrates a piezo-electric crystal which is arranged adjacent the nozzle in conventional fashion and the size of which, in this case its thickness, changes proportionally to the level of the voltage placed across the crystal. The crystal 8 is intended to produce disturbances which are conducted to the ink via the nozzle. These disturbances are intended to create disturbances in the jet 3, in order to cause the same to disintegrate into droplets. The greater the amplitude of these disturbances, the earlier, i.e. the closer to the nozzle, the jet is disintegrated. The crystal 8 need not be arranged directly adjacent the nozzle 1, but can instead be placed in the holder supporting the nozzle 1, or directly in the ink. The crystal 8 is intended to create disturbances of a pre-determined kind, such that the jet 3 can be disturbed in a given manner, so as to enable the disintegration of the jet 3 into droplets 4 to be determined. This disintegration of the jet 3 into droplets 4 is illustrated in FIG. 2; the reference 4' identifies droplets which are about to form.

In accordance with the invention, the level of the voltage applied is varied with regard to the predetermined frequency at which droplets are separated, coordinated or synchronized with the creation of said disturbances of given kind. In this way practically each droplet 4 can be given an individual pre-determined electrical charge.

FIG. 3 illustrates, inter alia, means for achieving the aforesaid coordinated variation.

FIG. 3, which is partly a block schematic, illustrates an embodiment of an ink jet printer according to the invention provided with a control system. The reference 9 identifies an information input of a data-conversion and character-generating unit 10, where said input information relates to a desired transcript or the like and comprises data obtained in, for example, so-called ASCII-code from a data processor. The unit 10 has a further input 11, via which information specifying the format of the transcript, such as character height and length, is fed in, where information supplied through the control input is converted to information relating to the mount of ink in the characters etc. Positional data is converted by means of the unit 10 into charging data, i.e. the desired locations of ink deposited on the transcript are translated to the requisite charge of the ink droplets. Connected to the unit 10 is a unit 12 by means of which a voltage is applied to the ink. The unit 12 includes a digital-analogue converter and amplifier, for converting information received from the unit 10 into desired voltage levels for applying voltage to the ink.

The reference 13 identifies a "system clock", an oscillator, for rythmical timing of the control system, said clock 13 as just mentioned, comprising primarily an oscillator for producing oscillations of pre-determined characteristics. The oscillator 13 is connected with a drive unit 14, essentially an amplifier, for driving the piezo-electric crystal 8, such that the crystal can be caused to generate said disturbances in a manner determined by the oscillator 13.

The oscillator 13 is also connected with a charge-synchronizing unit 15, arranged to activate the unit 12, the unit 14, and a unit 16 which is intended to control compensation electrodes 17. The electrodes 17 will be described hereinafter. The reference 18 identifies a detector which is preferably arranged between the compensation electrodes 17 and the deflecting electrodes 6 and by means of which the electrical charge of droplets 4 passing the detector 18 can be detected, and which is connected with the synchronizing unit 15 via a unit 19 containing detector-electronic devices. The detector 18 is arranged to detect primarily a reference signal corresponding to the electric-charge pattern of droplets 4, thereby enabling, for example, driving of the system as a result of, for example, changes in temperature and pressure etc., to be detected. The unit 15 is arranged to compare the reference values with actual values detected by means of the detector 18, and to compensate for deviations between the two values via the units 12, 14 and 16. The reference 20 identifies a high-voltage unit, by means of which a constant high voltage is applied to the deflecting electrodes.

The level of the voltage applied to the compensation electrodes 17 is not primarily intended to be varied in time with the formation of droplets 4, but that the electrodes 17 are intended to be held at constant voltage over prolonged periods of time in relation to the frequency at which droplets are formed. The compensation electrodes 17, which in the illustrated embodiment number two, are preferably electrically insulated from one another and can be applied with voltage individually, thereby to enable the voltage of each electrode 17 to be individually regulated. The electrical charge of the droplets 4 can be varied by changing the voltage of the electrodes 17 in relation to the charge voltage, the voltage applied to the ink and/or the voltage difference between the two electro plates 17. In this way, the stream of ink droplets 4 can be acted upon so as to cause, inter alia, the droplet stream to move laterally and correspondingly upwards and downwards in FIG. 1, so as to influence the size of the characters to be printed.

The method according to the invention and the operational mode of the arrangement according to the invention will be substantially understood from the aforegoing.

Information relating to a desired transcript is thus fed into the data-conversion and character-generating unit 10, through the inputs 9 and 11. The information is converted by means of the unit 10, inter alia against the background of the printer characteristics, such as nozzle pressure, geometry, electrode charge etc., to charge data in the form of voltages for droplets 4, this charge data being supplied in digital form to the voltage applying unit 12, while taking into consideration the reference timing sent by the oscillator 13, to the unit 10. The data supplied to the unit 12 is converted therein to analogue signals, voltages, which are amplified and applied to the ink in the container 1 or in the nozzle 1. Similarly, with consideration to the reference timing of the oscillator 13, the crystal 8 is caused by the drive unit 14 to generate said disturbances, such as to create disturbances in the jet 3 and droplets are separated therefrom in coordination with the application of voltage to the ink, thereby to give each droplet 4 a pre-determined electrical charge corresponding to the level of voltage applied to the ink in the nozzle and the jet when the droplets are separated.

Thus, with regard to their directions of movement, the electrically charged droplets 4 are deflected in dependence upon the charge by means of the deflecting electrodes 6, so as to impinge upon the sheet 5, or like recording medium, at the intended location thereon. Droplets which are not to be used in the transcript are given a powerful charge and are caused to strike a collecting device 21, having the form of a tube 21 in the FIG. 1 embodiment, from where the collected ink is preferably returned to the ink-supply system.

The electrical charge of all droplets 4 can be influenced by means of the compensation electrodes 17. For example, the charge of droplets 4 passing between the electrodes 17 can be influenced by maintaining a voltage difference between said electrodes. The compensation electrodes function as reference means when charging droplets in conjunction with their separation from the jet 3, wherewith the electric charge of the droplets 4 can be affected by changing the voltage applied to the electrodes 17. This enables the stream of droplets 4 to be displaced laterally, to adjust the location of the characters on the recording medium 5, and also enables the character sizes to be changed.

Thus, the electrical charge of all droplets 4 can be influenced by the compensation electrodes 17. The manner in which the droplets are influenced takes place in a number of ways, inter alia in response to the charge of the electrodes 17 in relation to the voltage applied to the ink.

For example, if the electrodes 17 are earthed and, for example, a positive charge voltage is connected to the ink-supply passage, the ink in said passage will be positively charged, the level of this charge being the same throughout the whole of the ink-supply passage, from the nozzle to the point at which the droplets begin to separate, such that the discrete droplets 4 will be positively charged. In this case, the compensation electrodes 17 are effective in creating a constant, electrically neutral environment at the location at which the droplets 4 are formed. If the compensation electrodes are removed, the high-voltage field for deflecting the droplets will influence the charge of said droplets.

If, instead of being earthed, the electrodes 17 are connected to, for example, a positive voltage, $U_{KOMP}$, several situations are conceivable in dependence upon the charge on the ink-supply passage.

When the ink-supply passage is earthed, the discrete droplets 4 obtain an induced negative charge, because negatively charged pre-droplets 4' connected to the jet are attracted by the electrodes 17 while positively charged droplets are repelled and depart via the earthed connection.

When the ink-supply passage is connected to a positive voltage, approximately corresponding to $U_{KOMP}$ the unseparated droplets 4' passing through the ink-supply passage are positively charged with direct contact, conduction, while the compensation electrodes, as indicated above, induce a negative charge in the droplets, therewith enabling electrically neutral droplets 4 to be obtained, by suitable selection of voltages on the electrodes 17 and the ink-supply passage.

When the ink-supply passage is connected to a positive voltage which is much greater than $U_{KOMP}$ the ink-supply passage will provide the totally dominating charge contribution and the induced, negative, charge will only reduce the droplet-charge to a small extent. The droplets will thus be positively charged.

As will be understood, this function of the compensation electrodes can be applied, inter alia, when the charge voltage, the voltage applied to the ink-supply passage, is varied in keeping with the time at which the droplets are formed, thereby to enable each discrete droplet to be given an individual, pre-determined voltage under the influence of the charge voltage and the voltage applied by the compensation electrodes.

Since the electrical charge of all droplets 4, including those intended to be used in the transcript and those which are not intended to be used, i.e. the waste or splash droplets, is influenced by the voltage on the compensation electrodes, the whole of the movement path of the droplet stream between the deflecting electrodes 6 can be moved by changing said voltage. This enables the height location to be finely adjusted when, for example, printing characters on the printing sheet 5. The passage of the jet in the location of the collecting device 21 can also be adjusted so that these waste droplets are captured with the minimum of splash, without requiring mechanical means herefor.

The compensation electrodes 17 can also be given an extremely high, for example positive charge, wherewith the waste droplets can be given a very slight charge or a zero charge, such that these droplets are not deflected between the electrodes 6, but impinge upon the sheet 5. Thus, those droplets which are to form the transcript will obtain a negative charge. Those droplets formed when the ink-supply passage is earthed obtained the highest negative charge. The result of the aforesaid application of voltage to the electrodes 17 is a text which has been turn upside down.

The principle function of the compensation electrodes has been described in the aforegoing. However, since a voltage can be applied to each of the compensation electrodes 17 individually, additional, more complicated possibilities of affecting the charge on the droplets are afforded.

It is also conceivable to vary the voltage level on the compensation electrodes in keeping with the time at which the droplets are formed. This enables the charge of each individual droplet to be influenced, for the purpose of compensating for the influence exerted by one droplet upon another for example.

For detecting the drive characteristics of the system and other changes occurring therein, the detector 18 is operative in detecting the real values relating to the charge pattern of droplets 4 charged in accordance with a known reference-charge pattern, set-point values. The real values are compared with the set-point values in the charge-synchronizing unit 15. On the basis of this comparison, compensation is made by unit 15, which is arranged to activate the voltage-applying unit 12, the drive unit 14 and the unit 16 for regulating the compensation electrodes 17, so as to obtain synchronization with respect to the reference timing of the oscillator 13, and so that the correct voltage levels are applied to ink and compensation electrodes.

As will be understood from the aforegoing, the invention enables each discrete droplet to be charged individually and directly, by applying voltage thereto, which naturally enables a particularly high degree of accuracy and good resolution to be achieved in a printer where the droplets are electrically charged in accordance with the invention.

Although the invention has been described with reference to a particular embodiment thereof, it will be understood that modifications and minor changes can be made, without departing from the concept of the invention.

The units 10, 12, 13, 14, 15, 16 and 19 are substantially of a conventional kind, and hence have not been described in detail. These units may have any given design which enables them to fulfil the intended function.

Furthermore, the voltage may be applied to the ink whilst the ink is in the container 1 or in the nozzle 1.

As beforementioned, by varying the voltage on the compensation electrodes it is possible, inter alia, to move the whole of the text image in a vertical direction and, to a certain extent, to influence the size of the text, without varying the charge voltage applied to the ink. Thus, by varying the voltages on the compensation electrodes it is possible to replace, to a certain extent, mechanical adjustments with electrical adjustments. The voltages applied to the compensation electrodes may also be controlled from, for example, a data-processor system, arranged to automatically position the text correctly on a recording sheet, for example on a printed line, even when the sheet is not precisely in position. Another possibility is that of printing so-called indexed text, such as $H_2O$, $10^2$. A number of variations of the system per se can also be compensated for. In this respect, suitable means are provided for detecting the position of the sheet or like medium.

In accordance with a preferred embodiment of a detector system according to the invention, the detector is positioned at a given fixed distance from the nozzle. By then ensuring that the charges induced in the detector lie in constant phase with charging pulses supplied to the ink, it can be ensured that the location at which droplets are formed remains fixed. This can be effected in the following manner: For example, each 10th droplet is highly charged, whereupon the length of the charging pulse can be made to correspond, for example, to approximately half the time period between two droplets, while leaving the remaining droplets uncharged (or charged at a much lower level). When the highly charged droplet passes the detector, there is induced therein a voltage, which is suitably amplified before being used. When the amplitude of the piezocrystal is, for example, varied until its deflection from the detector is zero, the droplet-formation location will have been moved to such an extent that the charging pulse to the ink arrives at a moment in time when the droplet has already separated from the ink stream. The next droplet in line has no charge, since the charging pulse has disappeared before this droplet has separated from the stream. Correspondingly, it can be elected instead to detect the maximum signal from the detector. In principle, this method of procedure requires no differential amplifying system, although the provision of such a system will enable a reduction in sensitivity to external disturbances.

This charging of each 10th droplet, for example, enables the design of the detector to be simplified. In addition, the accuracy to which the detector is set becomes less critical. In such a system no mechanical complicated adjustments are required to ensure that the system will function satisfactorily, when, inter alia, the droplets to be detected have a very high charge. Thus, the reference pattern of the described embodiment includes heavily charged specified discrete droplets, and a comparison is made between the detected charging pattern and the reference pattern, and compensation effected in the aforedescribed manner.

As will be understood, the invention is not restricted to the described and illustrated embodiment, and that modifications can be made within the scope of the following claims.

I claim:

1. A method for applying an electric charge in ink jet printers of the so-called continuous kind, in which electrically conductive ink or like medium is forced in the form of a jet from a container through a nozzle or like device and caused to form droplets to which an electric voltage is applied and which, by passing said droplets through deflecting electrodes, to which a voltage is applied, are caused to travel along a path determined by, inter alia, said charge, in order to produce a predetermined transcript or the like on a printing sheet or like medium, and in which disturbances of a given kind are generated with the aid of a piezo-electric crystal (8), by means of which, said jet (3) is disturbed in a manner to disintegrate said jet (3) into droplets (4) in a predetermined fashion; characterized by electrically charging the ink in said nozzle (1) by varying the level of voltage applied with regard to the pre-determined frequency at which droplets are separated from the jet, thereby to give practically each droplet (4) an individual, pre-determined charge which is in relation to the level of voltage applied in conjunction with the separation of said droplets (4).

2. A method according to claim 1, characterized by causing droplets (4) to pass-by compensation electrodes (17), to each of which a voltage is applied individually and by means of which the electric charge of each discrete droplet (4) can be influenced by changing the voltage of the electrodes (17) in relation to the charge voltage, by changing the level of voltage applied to the ink, and/or by changing the voltage difference between the electrodes (17), among other things so that the stream of droplets (4) can be deflected and so that the size of the characters being printed can be changed.

3. A method according to claim 2, characterized by controlling the application of voltage to the compensation electrodes by means, for example, of a data-processing system, in a manner to automatically position the characters in the desired location on the printing sheet, a paper sheet or like medium, thereby to eliminate the affect of certain variations in the positioning of the printing sheet etc. on the location of the characters printed thereon.

4. A method according to claim 2, characterized by earthing the compensation electrodes (17) in order to provide a stable, electrically neutral environment at the location where the droplets (4) are formed.

5. A method according to claim 2, characterized by applying a voltage to the compensating electrodes (17) and earthing the ink in the nozzle.

6. A method according to claim 2, characterized by applying a voltage to the compensation electrodes (17), and by applying to the ink a substantially corresponding voltage with respect to magnitude and polarity, so that only a slight charge is given to the separated, discrete droplets (4), or so that no charge is applied thereto.

7. A method according to claim 2, characterized by applying voltage to the compensation electrodes (17), and by applying a much higher voltage to the ink in the nozzle.

8. A method according to claim 1, characterized by causing a stream of droplets (4) charged in accordance with a reference pattern to pass a detector (18) for detecting the charge of the droplets (4), and by comparing the detected charging pattern with a reference pattern, and by effecting compensation on the basis of said comparison.

9. A method according to claim 8, characterized in that said reference pattern is created substantially by charging given individual droplets (4) with a high electrical charge, the location of the point at which the droplets are formed being adjusted by varying the amplitude of the disturbances for the jet (3) until no signal, substantially no signal or maximum signal deriving from said individual droplets is obtained from the detector where each voltage pulse for charging said individual droplet has a duration which is much shorter than the time lapse between two sequential droplets (4), thereby to obtain a well defined position of the droplet-forming location.

10. A method according to claim 1, characterized in that droplets (4) which are not to contribute in producing the desired transcript are charged and therewith greatly deflected, and collected by means of a collecting device (21), and then preferably returned to the ink supply system.

11. An arrangement for applying an electric charge in ink jet printers of the so-called continuous kind, in which electrically conductive ink or the like located in a container therefor is forced through a nozzle therefrom in the form of a jet from which droplets are formed, and which includes means for electrically charging said droplets; and deflecting electrodes to which a voltage is applied and by means of which the droplets can be caused to travel along a movement path determined, inter alia, by said charge, in a manner to produce a given transcript or the like on a printing sheet or corresponding material, and in which a piezo-electric crystal (8) is provided and arranged to generate disturbances such as to disturb the jet (3), thereby enabling disintegration of the jet (3) into droplets (4) to be predetermined; characterized by means (7, 10, 12) for applying a voltage to the ink in the nozzle (1) in co-ordination with the generation of said disturbances of predetermined kind for disturbing the jet (3) whereby said voltage can be applied with regard to the frequency at which droplets (4) are separated from the jet, and whereby each droplet can be given an individual predetermined charge.

12. An arrangement according to claim 11, characterized by compensation electrodes (17), such as compensation plates (17), to each of which a voltage can preferably be applied individually, the separated droplets (4) being intended to pass said compensation electrodes (17) and said compensation electrodes being arranged to influence the charge on the droplets (4) where a constant, pre-determined voltage on the electrodes (17) is intended to prevail over long time periods in relation to the frequency at which droplets are formed, and where the voltage of the electrodes (17) is intended to be changed in relation to the charging voltage, the voltage applied to the ink, and/or the voltage difference between the electrode plates (17) is intended to be changed so that the stream of droplets (4) can be deflected and the size of the characters produced can be influenced.

13. An arrangement according to claim 12, characterized by means, such as a data-processing system, for controlling the application of voltage to the compensation electrodes in a manner such that the characters produced are automatically placed in desired locations on the printing sheet, paper sheet or like medium, thereby to eliminate the influence of certain variations in the positioning of the printing sheet etc. on the positioning of the produced characters.

14. An arrangement according to claim 11, characterized in that at least one detector (18) is arranged between the nozzle (1) or the like and the deflecting electrodes (6) for detecting real values relating to the charge on the droplets (4), where the droplets (4) are charged in accordance with a reference pattern; and in that a charge synchronizing unit (15) is provided for comparing the charging pattern of the droplets (4) detected by the detector (18) with set-point values of the charging pattern, such as said reference pattern; and in that the unit (15) is arranged to compensate for deviations between the real values and set-point values on the basis of said comparison.

15. An arrangement according to claim 12, characterized in that said reference pattern includes heavily charged individual droplets, said charging synchronizing unit (15) being arranged to adjust the location at which the droplets (4) are formed, by varying the amplitude of the disturbances for the jet (3) until no signal, substantially no signal or a maximum signal deriving from said individual droplets is obtained from said detector, each voltage pulse for charging said individual droplets having a duration which is much shorter than the time lapse between two sequential droplets (4), thereby to obtain a well-defined position of the droplet-forming location.

* * * * *